United States Patent
Nadeem et al.

(10) Patent No.: US 7,123,605 B1
(45) Date of Patent: Oct. 17, 2006

(54) METHOD AND SYSTEM FOR RE-ASSIGNMENT OF PACKET PIPES

(75) Inventors: Mohsin Nadeem, Overland Park, KS (US); Giridhar Satyanarayana, Mission, KS (US); Steven J. Becher, Overland Park, KS (US); John Quigley, Overland Park, KS (US); Joseph A. Fowler, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1059 days.

(21) Appl. No.: 10/200,725

(22) Filed: Jul. 22, 2002

(51) Int. Cl.
*H04L 12/26* (2006.01)
(52) U.S. Cl. ........................ 370/341; 455/453
(58) Field of Classification Search ........... 370/340, 370/341; 455/453
See application file for complete search history.

(56) References Cited

U.S. PATENT DOCUMENTS 4,700,340 A * 10/1987 Beranek et al. ............. 370/218
6,725,032 B1 * 4/2004 Sheridan et al. ............ 455/419

* cited by examiner

*Primary Examiner*—Melvin Marcelo

(57) ABSTRACT

A method and system for reassignment of packet-pipes at a telecommunications switch. Upon detection of an increase in capacity of a packet-pipe (originating from a cell-site, for instance) and determination that the increase would overload a handler-module at the switch, a processor may analytically identify one or more packet-pipe reassignments that should be made at the switch so as to accommodate the increase in capacity. The processor may do so by successively considering the viability and impact of various possible reassignments. And the processor may produce an output report that indicates the reassignment(s) to make in order to accommodate the increase in capacity.

24 Claims, 4 Drawing Sheets

METHOD AND SYSTEM FOR RE-ASSIGNMENT OF PACKET PIPES

BACKGROUND

1. Field of the Invention

The present invention relates to telecommunication systems and more particularly to allocation of switch processing resources within such a system. The invention is particularly useful in cellular wireless communication systems but could equally extend to apply in other sorts of communication systems as well. For purposes of illustration, this description will focus on the cellular wireless application.

2. Description of Related Art

In a typical cellular wireless communication system (wireless telecommunications network), an area is divided geographically into a number of cell sites, each defined by a radio frequency (RF) radiation pattern from a respective base station. And the base stations of the cells are then coupled to a switching system that provides connectivity to a transport network and/or to a signaling network. When a wireless client station (such as a cellular telephone, personal digital assistant, pager, or appropriately equipped portable computer, for instance) is positioned in a cell, the client station may then communicate via an RF air interface with the base station of the cell. Consequently, a communication path can be established between the client station and the network, via the air interface, the base station and the switching system.

As a general matter, each base station (or more generally cell site) in the system will include a number of channel element cards that pass communications between the air interface and the switching system. Each channel element card may support transmission of communications on a number of air interface communication channels (e.g., air interface channels, whether traffic channels or control channels) at once. In turn, a wireline trunk (e.g., a T1 line) or other link will typically couple a group of channel element cards with the switching system, transporting multiple communications at once between the cell site and the switching system.

The switching system, in turn, will then typically function to control operation of the various base stations (e.g., (i) controlling handoff as mobile client stations move between base stations, and (ii) controlling allocation of air interface resources). Additionally, the switching system usually functions as a transcoder, to convert the protocol of communications being passed between the air interface and downstream network elements. For instance, in a Code Division Multiple Access (CDMA) network, the air interface may carry voice signals as Enhanced Variable Rate Codec (EVRC) encoded data, while the transport network may carry voice signals as Pulse Code Modulation (PCM) encoded data. In such a network, the switching system may include a mechanism to convert between EVRC and PCM, so as to allow voice communications to pass seamlessly between the air interface and the transport network. Other examples are possible as well.

Generally speaking, the switching system may include a number of handler modules that will function to handle cell site communications, such as to perform the protocol conversion function noted above for instance. And the handler cards may then be coupled to a switching processor, which functions to route communications between the handler cards and the transport network and/or signaling network.

Thus, in operation, communications may pass from client stations over the air interface and through cell site channel element cards, over a T1 line to the switching system. And at the switching system, the communications may then pass through handler cards to the switching processor, which may then route the communications onto a transport or signaling network. Similarly, communications may pass from a network to the switching processor and in turn through protocol handler cards and over a T1 line to a cell site. At the cell site, channel element cards may then pass the communications along to the air interface, for transmission to client stations.

SUMMARY

Occasionally, it becomes necessary to change the configuration of a cell site, such as by adding more channel cards or by increasing the number of channels supported by the various cards, for instance. (Similarly, it may become necessary to change the configuration of the switching system.) When that happens, the load on the switching system may change accordingly.

For example, a particular handler module in the switching system may be set to handle communications from a first group of channel cards at a first cell site as well as communications from a second group of channel cards at a second cell site. If the size or the extent of communications from the first group increases, it is possible that the total load on the handler module might then exceed a maximum capacity of the handler module. And in that case, it would be necessary to rearrange the switching system so as to have some other handler module handle the communications from the first group of channel cards.

At the same time, however, it is generally desirable to balance communication loads among the various handler modules in a switching system. For example, if the switching system has a number of shelves containing various handler modules, it would be best to distribute cell site communications evenly among the various shelves, so as to avoid a losing vast network operation if a single shelf fails. Similarly, it would be best to distribute communications from a given cell site among multiple shelves, so as to avoid losing operation of an entire cell site if a single shelf fails. Other examples may exist as well.

An exemplary embodiment of the present invention provides a method and system for reassigning communications to handler modules in a switching system, in response to a change in cell site configuration. (Note that "reassignment" can be a process of determining what reassignments to make and/or a process of implementing the reassignments.) In this regard, the exemplary embodiment defines a set of functions that a computer processor can programmatically carry out to establish what reassignment(s) to make in view of a given cell site configuration change or other change and perhaps to then implement the reassignment(s). The exemplary embodiment may then take the form of (i) a method that includes carrying out those functions, (ii) a computer programmed to carry out those functions, or (iii) a machine-readable medium (e.g., CD, DVD, disk drive, tape etc.) encoded with instructions executable by a processor (i.e., one or more processors, whether or not co-located or operating in tandem) to carry out the functions, for instance.

As a general matter, the functions executed by the processor may include (i) detecting a cell site reconfiguration event, (ii) determining that the reconfiguration event would overload a handler module in the switching system, (iii) determining what changes to make in assignment of cell site communications to handler modules in the switching system, so as to efficiently accommodate the cell site reconfiguration event, and (iv) producing output indicating the changes to make in assignment of cell site communications to handler modules in the switching system. An engineer or automated system (e.g., the processor itself) may then carry out the changes indicated in the output, so as to effect reassignment of cell site communications.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Network Configuration

Figure 1:
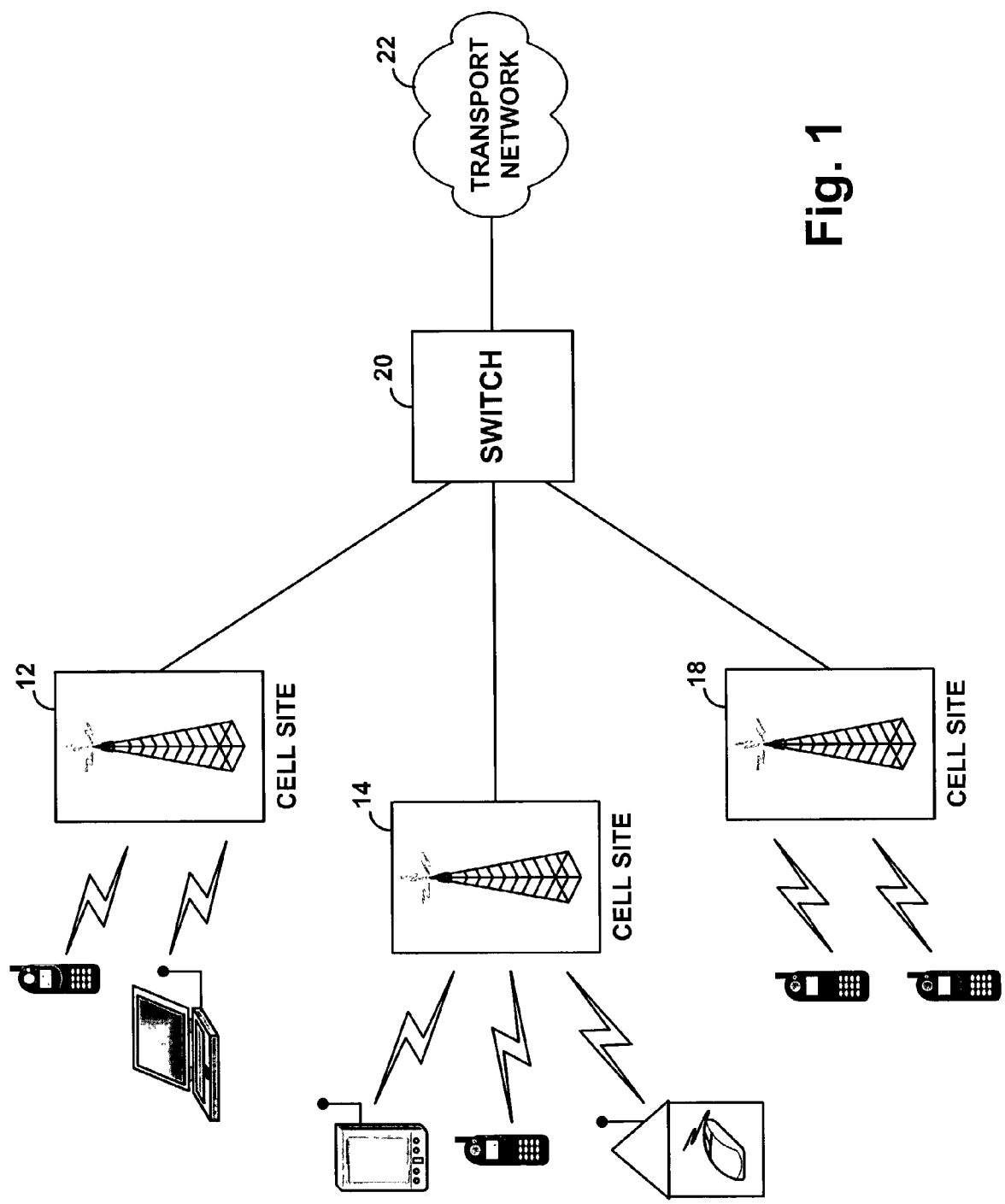
FIG. 1 is a block diagram of a network system in which the exemplary embodiment can be employed.

Referring to the drawings, FIG. 1 is a generalized network block diagram of a network system in which an exemplary embodiment of the invention could be employed. FIG. 1 depicts several cell sites 12, 14, 18 coupled to a common switching system ("switch") 20 that provides connectivity with a transport network (and/or signaling network) 22. Each of the various cell sites establishes an RF radiation pattern defining an air interface through which wireless client stations can communicate.

The client stations can take various forms, such as mobile phones, pagers, wireless PCs or PDAs or fixed wireless terminals. Further, numerous client stations might communicate concurrently over network 22 via a given cell site or via multiple cell sites. For instance, as shown by example in FIG. 1, a mobile phone and a wireless PC might communicate wirelessly with cell site 12 and then through switch 20 and over network 22. In turn, a wireless PDA, a mobile phone and a fixed wireless terminal (e.g., a wireless equipped house) might communicate wirelessly with cell site 14 and then through switch 20 and over network 22. And multiple mobile phones may then communicate wirelessly with cell site 16, through switch 20 and over network 22.

The cell sites and the air interfaces can also take any of a variety of forms. Commonly, for instance, each cell site will include at its core a base transceiver station (BTS), which has (i) an antenna structure (e.g., a number of antennas mounted on a tower or other structure) for communicating wirelessly with client stations and (i) cell site equipment for communicating with the switching system 20.

The antenna structure sends and receives RF energy in a particular pattern that constitutes a coverage area of the cell site, usually defining several sectors. Each client station within the coverage area can then similarly send and receive RF energy so as to exchange communications with the BTS. The protocol for these communications can take various forms, examples of which include AMPS, CDMA, TDMA and GSM.

The cell site equipment, in turn, functions to interface between the antenna structure on the one hand and the switching system on the other hand. In this regard, the BTS will usually be coupled with the switching system by a landline trunk such as a T1 line, or by some other link (whether wired or wireless). Because the BTS may support wireless communications with multiple client stations at once, the cell site equipment typically functions to aggregate those multiple communications onto the link to the switching system (and vice versa for communications coming from the switching system).

In an example configuration, packetized communications pass in frame relay over a T1 line between the cell site and the switch. Each T1 line includes 24 DS-0 (Digital Signal, level 0) channels (or "DS0s"), each of which is 64 kbps. Individual communications (whether user communications or overhead signaling) are carried between the cell site and the switch on individual "channel elements," which are effectively streams or sessions.

Each T1 line, in turn, can concurrently carry a number of communications between a cell site and a switch, in quantities or groups that may be referred to as "packet pipes." (More generally, a packet-pipe may be considered any block of communications that is sent to/from a switch or other equipment in a telecommunications network.) A given packet pipe ("PP") can have a set of characteristics, such as a number of DS0s used on the T1 line, a number of CEs carried, and an amount of bandwidth (e.g., packets per second) used on the T1 line, for instance. (Note that the term "call leg" is also sometimes used to represent the bandwidth used by a given communication. For instance, one call leg might be 100 packets per second. Also note that the amount of bandwidth used for a given CE might depend on various factors, such as on the amount of data being sent in the given CE; newer mobile phones, for instance, might provide better compression and therefore require less bandwidth for a given CE.)

It should be understood that packet pipes could take other forms as well, possibly being characterized by a set of parameters other than number of DS0s, number of CEs, and bandwidth. These characteristics are used in this description by way of example only.

a. Exemplary Cell Site Configuration

In a typical arrangement, as noted above, the cell site equipment will include a set of "channel element cards" (or other equivalent modules) which define "channel elements" and which support communications over T1 links (or other such links) with the switch 20. The channel element cards may have different capacities, depending on their type. For instance, in a CDMA system, a 3G card might have capacity to support 32 channel elements, while a CCU card might be able to support only 20 channel elements, and an ECU card might be able to support only 10 channel elements.

Each PP carried on a T1 line needs to be handled by the switch 20. And so, as will be explained more below, a controller at the switch assigns each given PP to be handled by particular equipment (e.g., protocol handlers) at the switch. This assignment is called a packet pipe assignment (PPA).

Usually, the CE cards in a given cell site are arranged in groups (one or more per group) each defining a packet pipe termination point (PPTP), i.e., a group of cell site equipment for which a given PPA is needed at the switch, to support communications between the switch and the cell site. Thus, each PP may cover a number of CEs at a time.

In a typical arrangement, for instance, the cell site will have a shelf unit that includes a number of shelves (or other equivalent groupings), and each shelf may define a number of slots (or other equivalent receptacles) for receiving cards (or other equivalent modules) such as CE cards. Each shelf of the unit may then be a respective PPTP, having a respective PPA at the switch. In some configurations, a cell site shelf may also be referred to as a "CCC."

Figure 2:
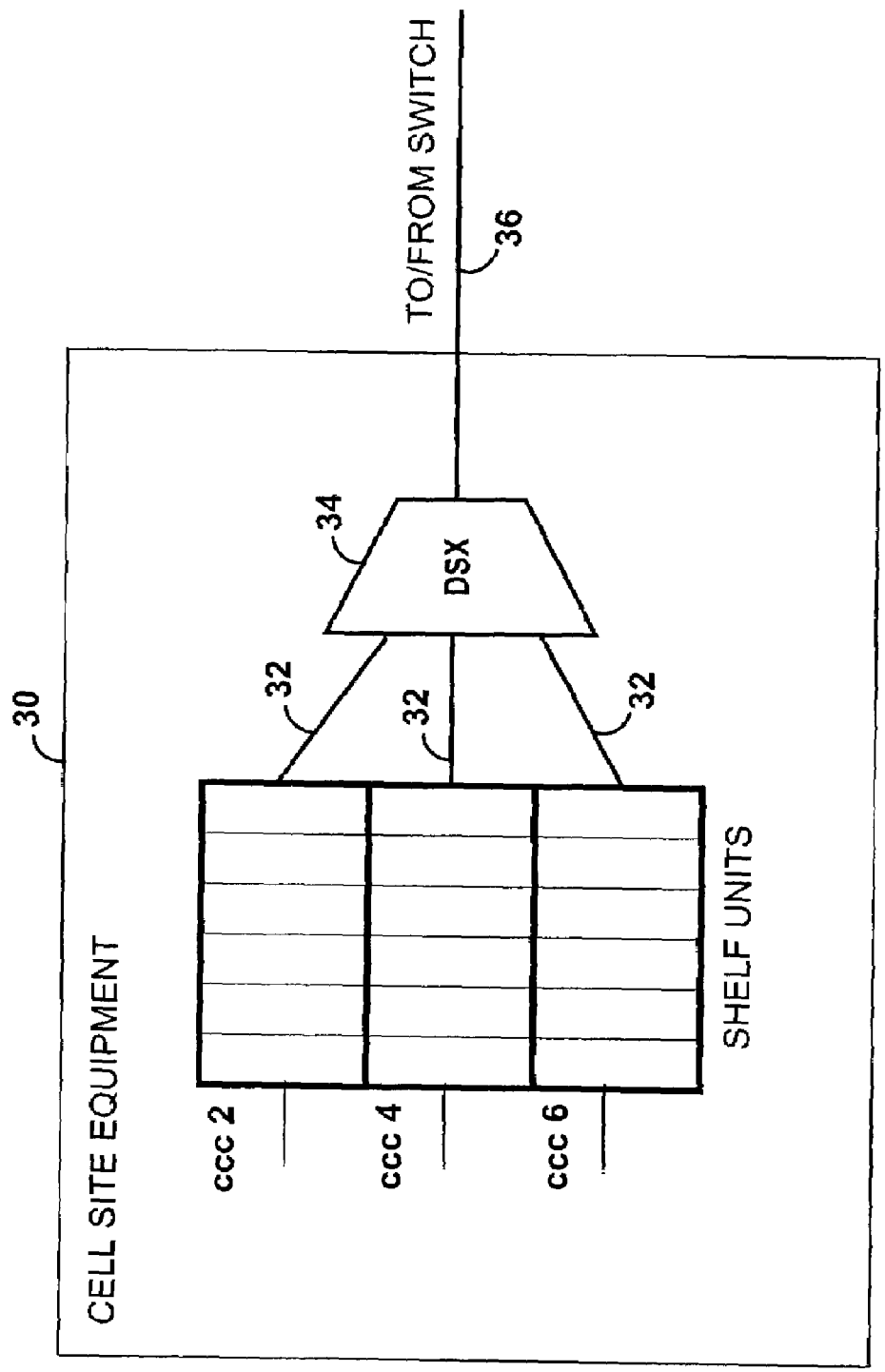
FIG. 2 is a block diagram of an exemplary cell site within the network of FIG. 1.

Referring to FIG. 2, for example, a block diagram of exemplary cell site equipment ("cell site") 30 is shown. Exemplary cell site 30 includes three shelves, designated respectively as "CCC 2", "CCC 4" and "CCC 6". And each shelf is shown to include 6 slots, which might be numbered 0 through 5. (Alternatively, the shelf unit could include a different number of shelves and/or slots.) In this arrangement, CCC 2 might constitute one PPTP, CCC 4 might constitute another PPTP, and CCC 6 might constitute another PPTP.

Each PPTP of the exemplary arrangement thus has a respective PP on a T1 line or other link to/from the switch and a respective PPA at the switch. Further, as noted above, each T1 line or other link between the cell site and switch may carry multiple PPs at once. Thus each T1 line may couple a number of PPTPs (e.g., shelves) to the switch. For instance, as shown in FIG. 2, backplane connections 32 from each shelf could feed into a multiplexer (MUX) such as a DSX 34, which might then feed into a given T1 line (or lines) 36 to/from the switch.

In the exemplary embodiment, each PPA at the switch defines, in total for a given PPTP (e.g., shelf), (i) a number of DS0s assigned, (ii) a number of CEs assigned, and (iii) an amount of bandwidth assigned.

Note, however, that the quantity or extent of communications actually supported by a given PPTP (e.g., sent by the PPTP to the switch) at any time could vary depending on factors such as how many CE cards are actually operating in a PPTP at that time, as well as on the capacity of those CE cards. For example, at one time, CCC 2 might hold 4 CE cards of a given capacity, but, due to engineering changes, at another time CCC 2 might hold 6 CE cards of that capacity, meaning that the PPTP of CCC 2 could then be sending more communications to the switch at once. Or at one time CCC 2 might hold 4 CE cards of a given capacity and, due to engineering changes, at another time CCC 2 might hold 4 CE cards of a greater capacity, meaning as well that its PPTP would be sending more communications to the switch at once.

PPTPs (e.g., shelves) at a cell site may also be grouped into groups of one or more PPTPs. In typical practice within a CDMA system, for instance, all of the CE cards for a given cell site carrier frequency will be on shelves that are grouped into a given CDM. Such a group of shelves may therefore be referred to as a "carrier" group. In the arrangement depicted in FIG. 2, for example, the three shelves (CCC 2, CCC4 and CCC 6) might cooperatively define a single carrier group. (Note that in some arrangements, each PPTP-group might alternatively be referred to as a "CDM.")

b. Exemplary Switch Configuration

As noted above, a switch will typically include protocol handling equipment that transcodes between the protocol used for communication with the switch and the protocol used for communication downstream (e.g., with other switches or network equipment). For instance, as also noted above, in a CDMA system, a switch may include protocol handler cards (or equivalent modules) that convert between EVRC encoded voice and PCM voice. These cards may be referred to as "PH" cards (or, in a more particular embodiment, as "PH4" cards).

A switch may then further include a hierarchy of switching modules (SMs). Each SM may include a number of shelves (or other equivalent groupings), and each shelf may define a number of slots (or other equivalent receptacles) for receiving cards (or other equivalent modules) such as PH cards.

Figure 3:
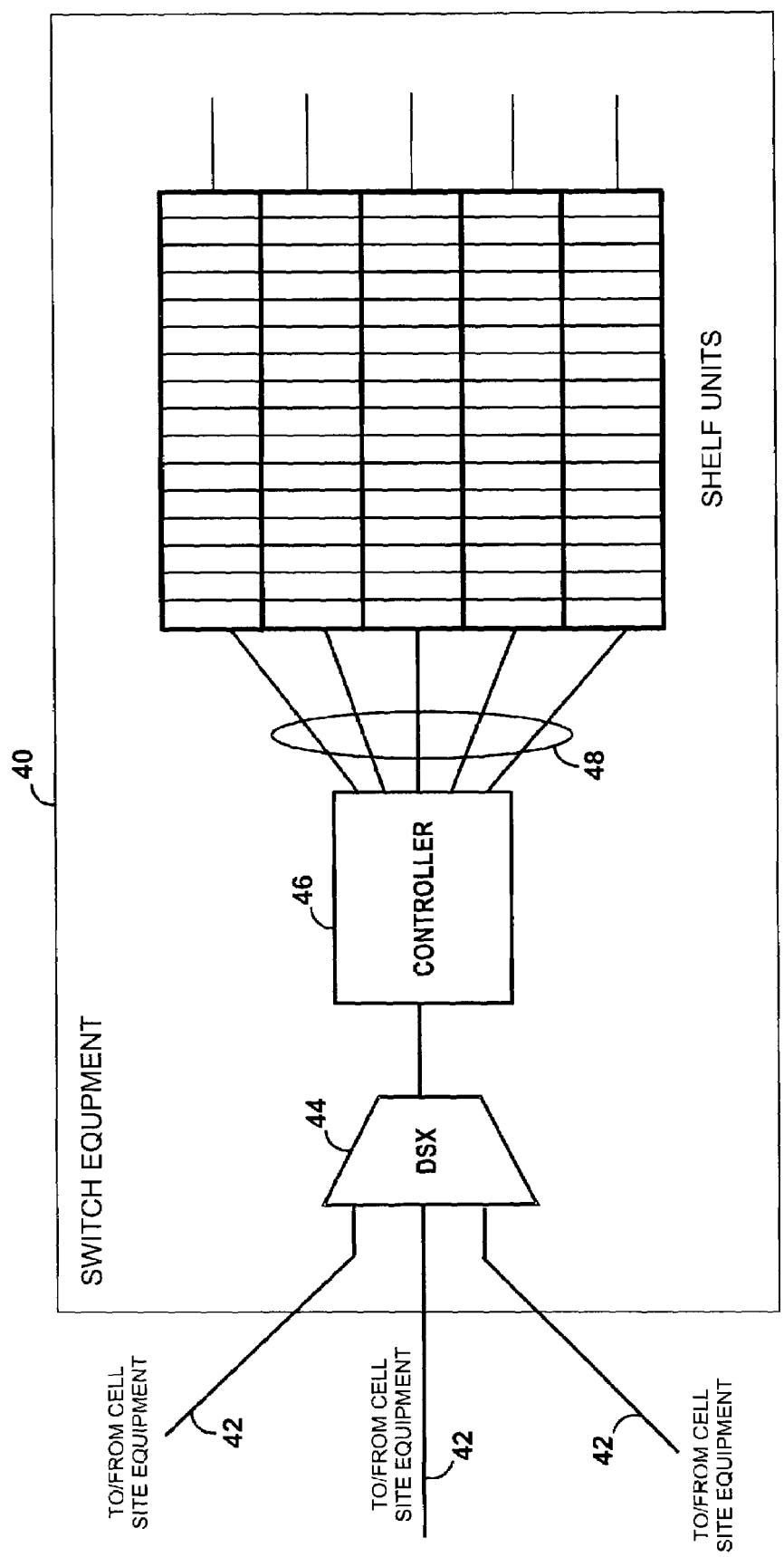
FIG. 3 is a block diagram of an exemplary switching system within the network of FIG. 1.

FIG. 3 depicts an exemplary switching system 40. As shown in FIG. 3, a given SM might be made up of a distinctive set of cabinets defining 5 shelves (which might be numbered 0 to 4), each with 16 slots (which might be numbered 0 to 15), thereby providing a total of 80 slots. T1 lines 42 feed from cell sites feed into a MUX, such as DSX 44, which feeds into a switch controller 46, which is then coupled by links 48 through backplanes of the various shelves (and, in some configurations, through cards designated as shelf control units), into the PH cards within the various slots.

Each shelf of an SM typically has a certain capacity limit, such as a maximum number of T1 time slots in total that its cards can handle. In this regard, each shelf typically has a communication path to a switching module processor (not shown), and the bandwidth of the communication path may determine the total number of timeslots of a given size that can be allocated to the cards on the shelf. (The bandwidth of the communication path might depend on the form of the communication path. For instance, electrical media might allow for up to 124 timeslots, while optical media might allow for up to 768 timeslots.) The capacity may also vary from shelf to shelf.

The switch will typically include a controller 46 that logically assigns PPs from various cell sites to the various PH cards for protocol handling. (These assignments are considered "logical" or "soft" rather than physical, because the signal paths are not fixed end to end but are rather routed logically by a processor through desired physical connections.) The controller may identify each PPA by a unique identifier, which may be referred to as a "UEN identifier" and which might specify (i) SM ID, (ii) PSU ID, (iii) Shelf ID, (iv) Channel Group and (v) Channel Number, for instance.

In operation, an exemplary call may thus come into the switch from a cell site as packetized EVRC data, carried in a DS0 channel, which is 1 of 24 timeslots on a T1 line. And the switch controller would then route the packets to a particular PH card. The PH card would convert the EVRC data to PCM data and send the PCM data off in timeslots on a T1 line to an SM processor, which would in turn route the PCM data along the transport network to another switch or other entity. Similarly, when the switch receives PCM data from the transport network, the switch may route the PCM data to a particular PH card, which may then convert the data to EVRC and send the EVRC data over a T1 line for transmission to a terminating cell site.

2. Limitations on Packet Pipe Assignments

Each PH card may handle one or more PPAs at a time. However, each PH card is typically able to handle up to only a maximum capacity of DS0s, CEs and bandwidth (and/or other PP characteristics) at a time. Therefore, given that each PPA is characterized by a particular number of DS0s, CEs and bandwidth, the PPs must be allocated among the PH cards in a way that does not exceed the capacity of the PH cards. Otherwise, calls could be dropped or blocked, or other difficulties could arise.

More generally, a set of engineering rules and physical restrictions (e.g., PH card hardware limitations) may limit how packet pipe assignments can be made. Merely by way of example, some limitations might be:

(a) Each PH card may have hardware limits on the number of DS0s and amount of bandwidth it can handle at once.

(b) In order to avoid dropping too many calls at once, or for other reasons, each PH card may have an assigned limit (e.g., rather than a hardware limit) on the number of CEs that it can handle at once.

(c) Multiple PPs from a given cell site (each PP being from a respective PPTP (e.g., shelf) at the cell site) should preferably be assigned to different PH cards, and preferably to cards that are on different shelves at the switch. That way, if an entire shelf goes down, it would not bring down an entire cell site.

(d) Multiple PPs from a given PPTP-group (e.g., carrier) should preferably be assigned to different PH cards, and preferably to cards that are on different shelves at the switch.

(e) The switch should be load balanced. That is, it would be best to evenly distribute (or approach even distribution of) PPs among the various shelves and PH cards at the switch, again to minimize the problems caused by PH card or shelf downtime. Thus, when faced with the question of where to assign a new or revised PP, it would be best to consider the least-full shelf first.

(f) If multiple T1 lines from a cell site are handled by multiple SMs at a switch, it would be best to maintain the separation of those T1 lines. So it would be best to avoid moving one of the T1 lines from a cell site onto an SM that is already handling another one of the T1 lines from the same cell site.

3. Packet-Pipe Reassignment

As noted above, at times it becomes necessary to change the configuration of a cell site. In particular, it sometimes becomes necessary to change the characteristics of packet-pipes to/from a given cell site.

For example, as wireless carriers advance to support 3G (and later) packet data communications, cell sites require additional capacity. As a result, carriers may replace more traditional CCU and ECU channel element cards with higher capacity 3G channel element cards. As noted above, each 3G card has a 32 CE capacity, compared with a 10 or 20 CE capacity of the more traditional cards. Thus, by putting a 3G card in a slot of a PPTP in place of a CCU or ECU card, the total number of CEs of the PP produced by that PPTP increases.

And as another example, an altogether new CE card could be added into an existing PPTP at a cell site (e.g., into an otherwise empty slot), which would similarly change the characteristics of the PP for that PPTP. And as yet another example, a reduction in CEs could occur at an existing PPTP, which would also change the characteristics of the PP for that PPTP.

When a PP changes, the PH card to which the PP is assigned will be affected. In particular, if the number of DS0s or CEs or the amount of bandwidth in the PP increases, it is possible that the number of DS0s or CEs or amount of bandwidth might then exceed the maximum capacity of the PH card.

For example, assume a PPTP at a cell site has a PP characterized by 20 CEs and 6 DS0s to support the 20 CEs, and that PP is assigned to a particular PH card at a switch. And assume next that 20 more CEs are added to the cell site as part of that PPTP. As a result, it may be necessary to add 6 more DS0s. But assume further that the PH card does not have sufficient capacity to support the additional 6 DS0s, the additional 20 CEs and/or the associated additional bandwidth.

In that instance, a change in switch configuration becomes necessary, to support the changed cell site configuration (e.g., the additional DS0s, CEs or bandwidth). The change can take various forms. For example, the PP could be reassigned to another PH card (possibly necessitating movement of a PP from that other PH card to yet another PH card, to make room for the changed PP). And as another example, the PP could be kept on its current PH card, and some other PP could be reassigned from that PH card to another PH card, to make room for the changed PP.

Any change to the switch configuration should, however, take into account the limitations set forth above, and/or other applicable limitations. For instance, if a PP is reassigned from one PH card to another, it should preferably not be assigned to a PH card that already has a PPA from the same PPTP-group.

a. Exemplary Process

Figure 4:
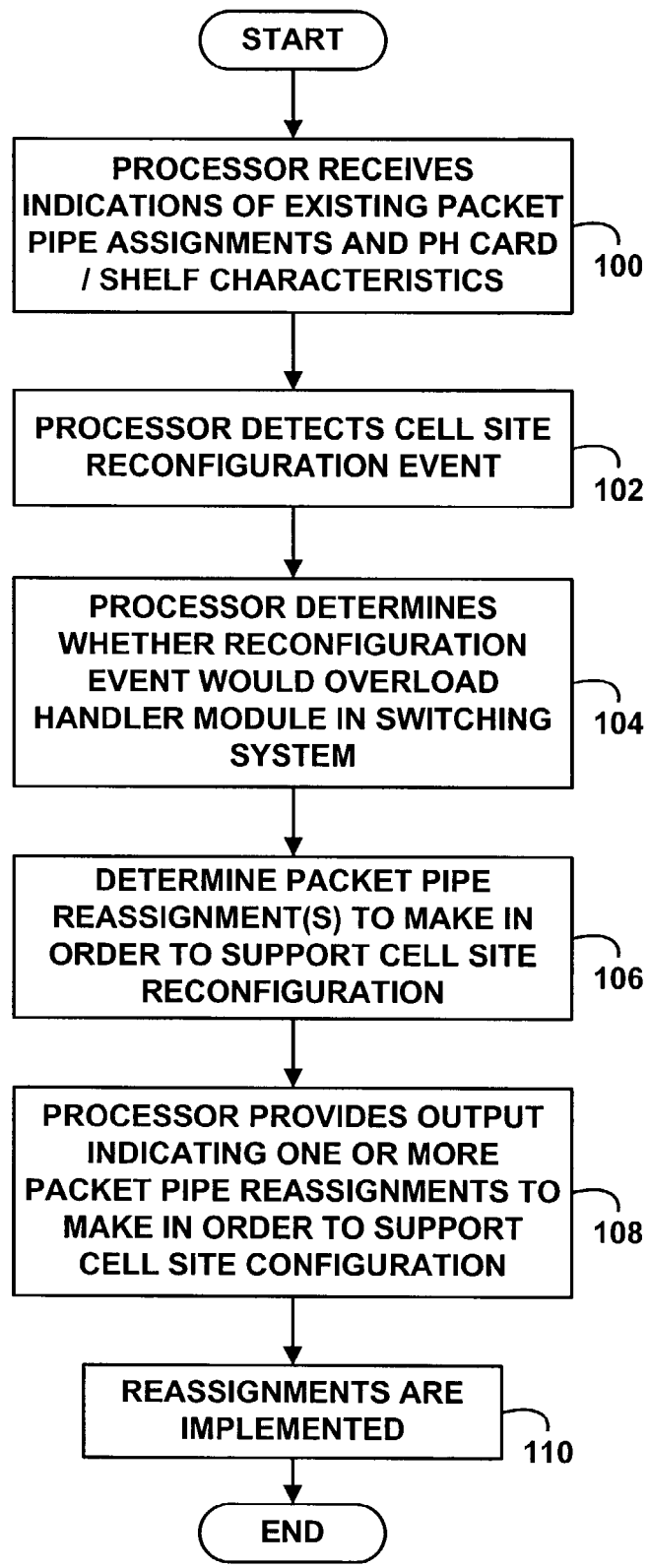
FIG. 4 is a flow chart of functions that can be carried out in accordance with the exemplary embodiment.

As noted above, the exemplary embodiment provides a mechanism for reassigning communications to handler modules or other equipment in a switching system, in response to change(s) in cell site configuration. The exemplary embodiment may take the form of a software application (e.g., set of machine language instructions) that is stored in data storage (e.g., memory) and executable by a processor. (By way of example, the application and processor may reside on, or be in communication with, switch controller 46, to facilitate implementation of reassignments.) FIG. 4 is a generalized flow chart depicting functions of the exemplary mechanism.

As shown in FIG. 4, at block 100, a processor begins with (has access to) input indicative of existing packet pipe assignments and PH card (and shelf) characteristics at a switching system. For instance, the input might indicate, per PH card in the switching system, (i) which PPA(s) the PH card is set to handle (i.e. which PPA(s) the switch controller 46 is set to send to the card), including the characteristics (e.g., DS0s, CEs and bandwidth) of each PPA, and (ii) what the characteristics are of the PH card (e.g., maximum capacity of DS0s, CEs and bandwidth). Further, the input might indicate the total time-slot capacity of each shelf at the switch. An engineer might input some or all of this information manually into the processor, and/or the processor might automatically extract or obtain some of this information, by polling the PH cards and/or shelf control units for instance.

At block 102, the processor then detects a cell site reconfiguration event. For instance, the processor could receive engineer-provided input indicating changes (e.g., proposed changes) to the cell site. (For example, an engineer may input the changes through a suitable graphical user interface (GUI) into a provisioning system executed by the processor.) Alternatively, the processor may automatically detect or learn of changes to the cell site (e.g., by polling the cell site, or by the cell site or other controller pushing change reports to the processor).

In the exemplary embodiment, the changes will include a change to at least one PPTP and preferably at least one increase in PP capacity of at least one PPTP. Examples of changes to a PPTP might be (a) add a 3G card in slot 3 of a given PPTP, or (b) remove an ECU card from slot 1 of the PPTP, remove an ECU card from slot 2 of the PPTP, and add a 3G card to slot 2 of the PPTP. In turn, the resulting increase in PP capacity of the PPTP might be an increase in DS0s, CEs and/or bandwidth carried in the PP.

At block 104, the processor then analyzes the change(s) to determine whether the reconfiguration event would overload a handler module in the switching system. For example, the processor may determine that the reconfiguration event would cause one or more characteristics of PPAs on a given PH card to exceed the capacity (limit) of the PH card. For instance, the processor may determine that, due to an increase in the number of DS0s or CEs or the amount of bandwidth of a given PP, the total number of DS0s or CEs and/or the total bandwidth on the PH card to which that PP was assigned (i.e., the total assignment to the PH card) would exceed the limit of the PH card (i.e., the capacity of the card).

At block 106, in response to a determination that the change would overload a handler module at the switching system, the processor then determines what changes to make in the assignment of cell site communications to handler modules in the switching system, so as to efficiently accommodate the cell site reconfiguration event. In the exemplary embodiment, the processor makes this determination by successively considering the viability and impact of various PP reassignments, taking into consideration factors such as (i) PH limitations and (ii) PPA limitations as noted above for instance.

At block 108, the processor then provides output in the form of a set of instructions (e.g., step-by-step), for instance, that indicate one or more changes to make in the assignment of cell site communications to handler modules in the switching system, so as to accommodate the cell site changes. In the exemplary embodiment, the processor produces this set of output instructions as it successively attempts various PP reassignments, adding possible changes to a change-log as it proceeds, and by removing changes from the log upon determination that an attempted change would not work. Thus, in the end, the log reflects the best changes to make, according to the processor.

At block 110, an engineer or automated system could then follow the output instructions so as to effect the designated change(s) in packet pipe assignments. For example, an engineer could review the output log and could re-program the switch controller accordingly (to logically connect/ assign packet pipes to particular PH cards). And as another example, the processor could signal directly to the switch controller 46 (or, as noted above, could be integrated in the switch controller) so as to provide the switch controller with reassignment instructions, and the switch controller could then programmatically carry out the designated reassignment(s).

b. Exemplary Determination of What PPA Changes to Make

As noted above, the processor can determine what PP reassignments to make by successively considering the viability and impact of various possible PP reassignments, taking into account engineering rules and/or other limitations deemed to be applicable. In practice, one way for the processor to do so when faced with a revised PP is to carry out the following phases of analysis until the processor concludes that reassignment is (or will be) complete/successful:

(i) Attempt to reassign the revised PP ($PP_1$) from its current PH card ($PH_1$) to another PH card ($PH_2$) on the same shelf.

(ii) Attempt to reassign the revised PP ($PP_1$) from its current PH card ($PH_1$) to another PH card ($PH_3$) on another shelf.

(iii) Attempt to remove another PP ($PP_2$) from the revised PP's current PH card ($PH_1$) to make room for the revised PP ($PP_1$). Repeat phases (i) and (ii) for the $PP_2$ being removed.

(iv) Attempt to find another PH card ($PH_4$) to which the revised PP ($PP_1$) can be reassigned, and from which another PP ($PP_3$) can be removed to make room for the revised PP ($PP_1$) and can be moved to still another PH card ($PH_5$). Repeat phases (i)–(ii) to find a place for the revised PP ($PP_1$), while repeating phases (i)–(iii) for the other PP ($PP_3$) that would be removed to make room for $PP_1$.

(v) Attempt to find another SM to which the T1 line carrying the revised PP ($PP_1$) can be connected instead.

(An "attempt" in this sense may be a determination of whether the object of the attempt is viable and/or a determination of whether the object of the attempt is reasonable or desirable, taking into consideration engineering rules and/or other limitations that are deemed to apply.) Alternatively, the processor may carry out only some (one or more) of these phases of analysis and/or may carry out one or more other phases of analysis as well or instead.

(i) Attempt Reassignment to Other Card on Same Shelf

In the exemplary embodiment, at phase (i), the processor may successively consider each other PH card on the revised-PP's current shelf until the processor finds a card that has sufficient available capacity to handle the revised PP ($PP_1$). (Additionally, the processor can be set to avoid selecting any PH card that is already handling a PP from the same PPTP group as the revised PP ($PP_1$) or from the same cell site as the revised PP ($PP_1$)).

The processor could consider the cards on the shelf from left to right, or in order from least used to most used, or in any other order desired. If the processor finds a PH card ($PH_2$) with sufficient capacity to handle the revised PP, then the process is complete, and the processor need not proceed to phases (ii)–(v). If, however, the processor is unable to find a card that has sufficient available capacity, then the processor moves on to phase (ii).

(ii) Attempt Reassignment to Other Card on Other Shelf

At phase (ii), given the remaining shelves, the processor may select the shelf that has the least used capacity, that has sufficient available time slots to support the revised PP ($PP_1$), that does not already have a PPA from the same PPTP group as $PP_1$, and that has at least one PH card with sufficient available capacity to handle the revised PP ($PP_1$).

Thus the processor may successively consider shelves in order based on their extent of used capacity and, within each shelf, successively consider the cards on the shelf in search of a card with sufficient capacity to handle the revised PP ($PP_1$), until the processor finds a card ($PH_3$) that has sufficient available capacity to handle the revised PP ($PP_1$). In selecting the shelf that has the least-used capacity, the processor may select the shelf that has the lowest percentage of its capacity used (or set/assigned to use), and/or the shelf to which the least quantity of DS0s, CEs and/or bandwidth is assigned. Further, on a given shelf, the processor may successively consider the cards in any order, like the process described above.

If the processor finds a PH card ($PH_3$) with sufficient capacity to handle the revised PP ($PP_1$), then the process is complete, and the processor need not proceed to phases (iii)–(v). If, however, the processor is unable to find a card that has sufficient available capacity, then the processor moves on to phase (iii).

(iii) Attempt Reassignment of Other PP, to Make Room

At phase (iii), the processor seeks to find another PP (PP$_2$) that can be removed from the revised-PP's PH card (PH$_1$) to make room for the revised PP (PP$_1$) to stay on its current card (PH$_1$). In this regard, the processor preferably seeks the smallest PP that can be removed from PH$_1$ to make room on PH$_1$ for the revised PP (PP$_1$) to stay. Thus, the processor may successively consider the PPs on the current card (PH$_1$) in order from smallest (e.g., least quantity of DS0s, CEs and/or bandwidth) to largest. For each such PP, the processor may then apply phases (i) and (ii) as outlined above, in an effort to reassign the PP first to another PH card on the same shelf and, if no luck there, then to a PH card on another shelf.

If the processor finds a PP (PP$_2$) that can be removed from the current PH card (PH$_1$) to make room for the revised PP (PP$_1$) and the processor finds another PH card (PH$_3$) with sufficient capacity to handle the removed PP (PP$_2$), then the process is complete, and the processor need not proceed to phases (iv)–(v). If, however, the processor is unable to find a PP that can be removed from the current PH card and moved to another PH card, then the processor moves on to phase (iv).

(iv) Attempt Reassignment to Other Card from Which a PP can be Reassigned to Make Room At phase (iv), the processor tries to find a PH card (PH$_4$) to which the revised PP (PP$_1$) can be moved and from which some other PP (PP$_3$) can be reassigned to yet another PH card (PH$_5$). To carry out this process, the processor may go through the process of phases (i)–(ii) in search of another PH card to which the revised PP (PP$_1$) can be moved. But in doing so, the processor considers for each possible PH card whether sufficient capacity could be made available for the revised PP (PP$_1$) by removing some other PP (PP$_3$) from the card. For each such other PP (PP$_3$), the processor thus considers whether the PP (PP$_3$) can be moved to some other PH card (PH$_5$), like the process described above for PP$_2$ in phase (iii).

If the processor finds a PH card (PH$_4$) to which the revised PP (PP$_1$) can be moved upon removal of another PP (PP$_3$) from PH$_4$, and the processor finds another PH card (PH$_5$) to which that other PP (PP$_3$) can be moved, then the process is complete, and the processor need not proceed to phase (v). If, however, the processor is unable to a PH card (PH$_4$) to which the revised PP (PP$_1$) can be moved upon removal of another PP (PP$_3$) from PH$_4$, and/or the processor is unable to find another PH card (PH$_5$) to which that other PP (PP$_3$) can be moved, then the processor moves on to phase (v).

(v) Attempt Reassignment by Moving T1 Link

At phase (v), the processor seeks to move the revised PP's T1 line to another SM altogether. In doing so, the processor successively considers other SMs in search of the first SM that is not already serving the revised PP's cell site. If the processor finds such another SM, then the processor may repeat phases (ii)–(iv) with respect to the shelves and cards in that other SM until the processor establishes suitable reassignment(s) to handle the revised PP.

c. Exemplary Output Report

As noted above, the processor may produce a set of output instructions as it recursively attempts various PP reassignments, by adding possible changes to a change-log as it proceeds through phases (i)–(v), and removing one or more changes from the log upon determination that an attempted change would not work.

By way of example, as the processor applies phase (i) for a given revised PP (PP$_1$), the processor may consider moving the revised PP (PP$_1$) from its current PH card (PH$_1$) to some other card (PH$_2$). Thus, the processor may record that reassignment in the change-log. If the processor then determines, however, that the change would not work (e.g., that there is insufficient room on PH$_2$ to handle the revised PP (PP$_1$)), then the processor may delete that reassignment from the change-log.

As another example, as the processor applies phase (iii) for a given revised PP (PP$_1$), the processor may consider moving the revised PP (PP$_1$) from its current PH card (PH$_1$) to another PH card (PH$_{4A}$) and reassigning some other PP (PP$_{3A}$) from that other PH card (PH$_{4A}$) to yet another PH card (PH$_{5A}$) to make room for the revised PP (PP$_1$). Thus, the processor may record in the change-log the following two reassignments: (i) "reassign PP$_1$ from PH$_1$ to PH$_{4A}$," and (ii) "reassign PP$_{3A}$ from PH$_{4A}$ to PH$_{5A}$." (In practice, the processor could identify the various packet pipes in the log by their UEN identifiers.)

If the processor then determines that PP$_5$ does not have sufficient capacity to support PP$_{3A}$, then the processor may delete the second of two those reassignments from the change-log. In turn, the processor might then to consider reassigning PP$_{3A}$ from PH$_{4A}$ to PH$_{5B}$ instead. Thus, the processor may record in the change-log the reassignment "reassign PP$_{3A}$ from PH$_{4A}$ to PH$_{5B}$."

If the processor determines that that reassignment will work and that the process is complete, then the change-log is complete. Alternatively, if the processor determines that the change would not work, then the processor may delete one or more entries in the change-log and proceed again to consider another possible reassignment.

d. Handling Multiple PP Reassignments at Once

In the exemplary embodiment, the process described above can be applied to automatically establish packet pipe reassignments in response to multiple cell site changes and therefore in response to multiple changes in packet pipes. In particular, the processor can detect multiple cell site reconfiguration events and can determine that the reconfiguration events will result in multiple instances of overload at the switch. In response, the processor may then perform the above analysis successively for each instance of overload. And the processor may produce an output report indicative of all of the reassignments that should be made in order to accommodate the reconfiguration events.

4. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In a network comprising a switch having a plurality of handler-modules and a controller that assigns packet-pipes to be handled by particular ones of the handler-modules, a method comprising, in response to a determination that an increase in capacity of a first packet-pipe of the plurality of packet-pipes will overload a first handler-module to which the first packet-pipe is assigned:

operating a processor to identify one or more packet-pipe reassignments at the switch that will accommodate the increase in capacity; and operating the processor to provide an output indicating the one or more identified packet-pipe reassignments, whereby the one or more identified packet-pipe reassignments maybe implemented as indicated by the output.

2. The method of claim 1, wherein the first handler-module comprises a protocol-converter.

3. The method of claim 2, wherein the packet-pipe comprises cell site communications, and wherein the protocol-converter converts between EVRC encoded data and PCM encoded data.

4. The method of claim 1, wherein the first packet-pipe carries communications between a cell site and the switch, and wherein the increase in capacity of the first packet-pipe occurs as a result of a reconfiguration event at the cell site.

5. The method of claim 4, further comprising operating the processor to detect the reconfiguration event.

6. The method of claim 1, wherein operating a processor to identify one or more packet-pipe reassignments at the switch that will accommodate the increase in capacity comprises:
operating the processor to successively consider viability and impact of possible packet-pipe reassignments, until the processor identifies the one or more packet-pipe reassignments that will accommodate the increase in capacity of the first packet-pipe.

7. The method of claim 1, further comprising:
operating the processor to detect the increase in capacity of the first packet-pipe; and
operating the processor to determine that the increase in capacity will overload the first handler-module.

8. The method of claim 7, wherein the first packet-pipe has characteristics including (i) a number of DS0s used by the first packet-pipe, (ii) a number of channel elements supported by the first packet-pipe and (iii) an amount of bandwidth used by the first packet-pipe, and wherein operating the processor to detect the increase in capacity of the first packet-pipe comprises operating the processor to detect an increase in at least one of the characteristics of the first packet-pipe.

9. The method of claim 8, wherein operating the processor to detect an increase in at least one of the characteristics comprises operating the processor to receive input indicative of the increase.

10. The method of claim 7, wherein operating the processor to determine that the increase in capacity will overload the first handler-module comprises:
operating the processor to determine that the increase in capacity of the first packet-pipe will result in the total assignment of channel elements to the first handler-module exceeding a predefined channel element limit for the first handler-module.

11. The method of claim 7, wherein the processor has access to information indicating existing packet-pipe assignments and indicating capacities of the handler-modules, and wherein operating the processor to determine that the increase in capacity will overload the first handler-module comprises:
operating the processor to determine that the increase in capacity will result in a total assignment to the first handler-module greater than the capacity of the first handler-module.

12. The method of claim 1, wherein operating the processor to provide the output indicating the one or more identified packet-pipe reassignments comprises:
operating the processor to provide an output report indicating the one or more packet-pipe reassignments at the switch that will accommodate the increase in capacity.

13. The method of claim 12, wherein the output report provides step-by-step instructions indicating the one or more packet-pipe reassignments to make in order to accommodate the increase in capacity.

14. The method of claim 12,
wherein operating a processor to identify one or more packet-pipe reassignments at the switch that will accommodate the increase in capacity comprises operating the processor to successively consider viability and impact of possible packet-pipe reassignments, until the processor identifies the one or more packet-pipe reassignments that will accommodate the increase in capacity; and
wherein operating the processor to provide an output report indicating the one or more packet-pipe reassignments at the switch that will accommodate the increase in capacity comprises operating the processor to produce a change-log as the processor successively considers the viability and impact of possible packet-pipe reassignments.

15. The method of claim 1, wherein the first handler-module is situated on a shelf at the switch, and wherein operating the processor to identify one or more packet-pipe reassignments at the switch that will accommodate the increase in capacity comprises:
operating the processor to identify, on the shelf, a second handler-module to which the first packet-pipe could be reassigned.

16. The method of claim 1, wherein the first handler-module is situated on a first shelf of multiple shelves at the switch, and wherein operating the processor to identify one or more packet-pipe reassignments at the switch that will accommodate the increase in capacity comprises:
operating the processor to identify, on a second shelf of the multiple shelves, a second handler-module to which the packet-pipe could be reassigned.

17. The method of claim 1, wherein a second packet-pipe is also assigned to be handled by the first handler-module, and wherein operating the processor to identify one or more packet-pipe reassignments at the switch that will accommodate the increase in capacity comprises:
operating the processor to identify a second-handler module to which the second packet-pipe can be reassigned from the first handler-module, so as to make room for the first packet-pipe to remain assigned to the first handler-module.

18. The method of claim 1, wherein operating the processor to identify one or more packet-pipe reassignments at the switch that will accommodate the increase in capacity comprises:
operating a processor (i) to identify a second handler-module to which the first packet-pipe can be reassigned, wherein a second packet-pipe is assigned to be handled by the second handler-module, and (ii) to identify a third handler-module to which the second packet-pipe can be reassigned from the second handler-module.

19. The method of claim 1, wherein the first handler-module is situated on a first shelf of multiple shelves at the switch, and wherein operating the processor to identify one or more packet-pipe reassignments at the switch that will accommodate the increase in capacity comprises operating the processor to sequentially attempt the following until the processor determines that reassignment is complete:
(i) reassignment of the first packet-pipe to a second handler-module on the first shelf;
(ii) reassignment of the first packet-pipe to a third handler-module on a second shelf of the multiple shelves;
(iii) reassignment of a second packet-pipe from the first handler-module, to make room on the first handler-module for the first packet-pipe; and
(iv) reassignment of the first packet-pipe to a fourth handler-module and reassignment of a second packet-pipe from the fourth handler-module to a fifth handler-module to make room on the fourth handler-module for the first packet-pipe.

20. A computer-readable medium having stored thereon a set of program instructions executable by a processor to carry out the method of claim 1.

21. A processor programmed with a set of program instructions that are stored on a computer-readable medium and executable to carry out the method of claim 1.

22. A method of reassigning packet pipes in a telecommunications switch, the method comprising:
   attempting to reassign a first packet-pipe from a first handler-module to a second-handler module;
   attempting to reassign a second packet-pipe from the first handler-module to make room for the first packet-pipe on the first handler-module; and
   attempting to reassign the first packet-pipe from the first handler-module to a second handler-module and to reassign a second packet-pipe from the second handler-module to a third handler-module to make room for the first packet-pipe on the second handler-module.

23. A computer-readable medium having stored thereon a set of program instructions executable by a processor to carry out the method of claim 22.

24. A processor programmed with a set of program instructions that are stored on a computer-readable medium and executable to carry out the method of claim 22.

* * * * *